US009264443B2

(12) United States Patent
Weisman (10) Patent No.: US 9,264,443 B2
(45) Date of Patent: Feb. 16, 2016

(54) BROWSER BASED METHOD OF ASSESSING WEB APPLICATION VULNERABILITY

(75) Inventor: Omri Weisman, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 873 days.

(21) Appl. No.: 12/197,461

(22) Filed: Aug. 25, 2008

(65) Prior Publication Data

US 2010/0050263 A1 Feb. 25, 2010

(51) Int. Cl.
*G06F 21/00* (2013.01)
*H04L 29/06* (2006.01)
*G06F 21/57* (2013.01)

(52) U.S. Cl.
CPC .......... *H04L 63/1433* (2013.01); *G06F 21/577* (2013.01)

(58) Field of Classification Search
CPC ........................... G06F 21/577; G06F 63/1433
USPC .................. 726/25, 5; 1/1; 709/204, 219, 227
See application file for complete search history.

(56) References Cited

U.S. PATENT DOCUMENTS

| 6,584,569 | B2* | 6/2003 | Reshef et al. | 726/25 |
| 7,178,166 | B1* | 2/2007 | Taylor et al. | 726/25 |
| 2003/0005044 | A1 | 1/2003 | Millet et al. | |
| 2005/0132232 | A1 | 6/2005 | Sima et al. | |
| 2006/0272011 | A1 | 11/2006 | Ide et al. | |
| 2007/0061877 | A1 | 3/2007 | Sima et al. | |
| 2008/0271151 | A1* | 10/2008 | Blake et al. | 726/25 |
| 2009/0119769 | A1* | 5/2009 | Ross et al. | 726/13 |

FOREIGN PATENT DOCUMENTS

WO  WO2006044835 A2  4/2006

OTHER PUBLICATIONS

Stefan Kals, Engin Kirda, Christopher Kruegel, Nenad Jovanovic, "SecuBat: a web vulnerability scanner", Proceedings of the 15th international conference on World Wide Web, May 23-26, 2006,pp. 247-256. Edinburgh, Scotland. [retrieved from ACM database Sep. 16, 2011].*

Yao-Wen Huang, Fang Yu, Christian Hang, Chung-Hung Tsai, Der-Tsai Lee, Sy-Yen Kuo, Securing web application code by static analysis and runtime protection, Proceedings of the 13th international conference on World Wide Web, May 17-20, 2004, New York, NY, USA [retrieved from ACM database Sep. 16, 2011].*

(Continued)

*Primary Examiner* — Saleh Najjar
*Assistant Examiner* — Oleg Korsak
(74) *Attorney, Agent, or Firm* — Kali Law Group, P.C.

(57) ABSTRACT

A novel and useful mechanism and method for assessing the vulnerability of web applications while browsing the application. As a user interacts with the web application, HTTP requests are sent from the browser to the web server. Each HTTP request is analyzed to determine if its associated elements need testing. Vulnerability assessment tests are sent to the server. Test results are then returned to the browser, where they are analyzed, displayed and/or stored in a log file.

25 Claims, 5 Drawing Sheets

(56) References Cited

OTHER PUBLICATIONS

Yao-Wen Huang, Shih-Kun Huang, Tsung-Po Lin, Chung-Hung Tsai, Web application security assessment by fault injection and behavior monitoring, Proceedings of the 12th international conference on World Wide Web, May 20-24, 2003, Budapest, Hungary [retreived from ACM database on Feb. 28, 2012].*

Auronen, L; "Tool-Based Approach to Assessing Web Application Security", Seiminar on Network Security, 2002. [retreived on Jun. 17, 2012 from CiteSeer database].*

* cited by examiner

BROWSER BASED METHOD OF ASSESSING WEB APPLICATION VULNERABILITY

FIELD OF THE INVENTION

The present invention relates to the field of web application security, and more particularly relates to a method of detecting web application security vulnerabilities as the application is executing.

SUMMARY OF THE INVENTION

There is thus provided in accordance with the invention, a method of assessing the vulnerability of a web form, the web form comprising one or more elements loaded from a server to a browser, the method comprising the steps of monitoring one or more HTTP requests transmitted from the browser to the server, analyzing the one or more HTTP requests to detect one or more elements to be analyzed, executing one or more security vulnerability tests for the one or more elements to be analyzed and displaying the results of the one or more security vulnerability tests.

There is also provided in accordance of the invention, a method of assessing the vulnerability of a web form, the web form comprising one or more elements loaded from a server to a browser, the method comprising the steps of monitoring one or more HTTP requests transmitted from the browser to the server, analyzing the one or more HTTP requests to detect one or more elements to be analyzed, executing one or more security vulnerability tests for the one or more elements to be analyzed and saving the results of the one or more security vulnerability tests to a log file.

There is further provided a computer program product for assessing the vulnerability of a web form, the web form comprising one or more elements loaded from a server to a browser, the computer program product comprising a computer usable medium having computer usable code embodied therewith, the computer program product comprising computer usable code configured for monitoring one or more HTTP requests transmitted from the browser to the server, computer usable code configured for analyzing the one or more HTTP requests to detect one or more elements to be analyzed, computer usable code configured for executing one or more security vulnerability tests for the one or more elements to be analyzed and computer usable code configured for displaying any detected the results of the one or more security vulnerability tests.

There is also provided a computer program product for assessing the vulnerability of a web form, the web form comprising one or more elements loaded from a server to a browser, the computer program product comprising a computer usable medium having computer usable code embodied therewith, the computer program product comprising computer usable code configured for monitoring one or more HTTP requests transmitted from the browser to the server, computer usable code configured for analyzing the one or more HTTP requests to detect one or more elements to be analyzed, computer usable code configured for executing one or more security vulnerability tests for the one or more elements to be analyzed, computer usable code configured for saving the results of the one or more security vulnerability tests to a log file and computer usable code configured for displaying the log file.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document:

| Term | Definition |
| --- | --- |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| AQ\IQA | Quality Assurance |
| RAM | Random Access Memory |
| RF | Radio Frequency |
| ROM | Read Only Memory |
| SQL | Structured Query Language |
| URL | Uniform Resource Locator |
| WAN | Wide Area Network |
| XSS | Cross-Site Scripting |

Detailed Description of the Invention

The present invention is a method of assessing the vulnerability of web applications while browsing the application. As a user interacts with the web application, HTTP requests are sent from the browser to the web server. Each HTTP request is analyzed to determine if its associated elements needs testing (including but not limited to HTTP parameters, URL parameters, cookies). Vulnerability assessment tests are sent to the server. Test results are then returned to the browser, where they are analyzed, displayed and/or stored in a log file.

One application of the invention is to facilitate the development browser add-ons which monitor the security vulnerability of web forms as they are accessed and submitted. These tools will enable developers Quality Assurance (QA) personnel and security auditors to easily and rapidly test specific business-processes in a given application.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
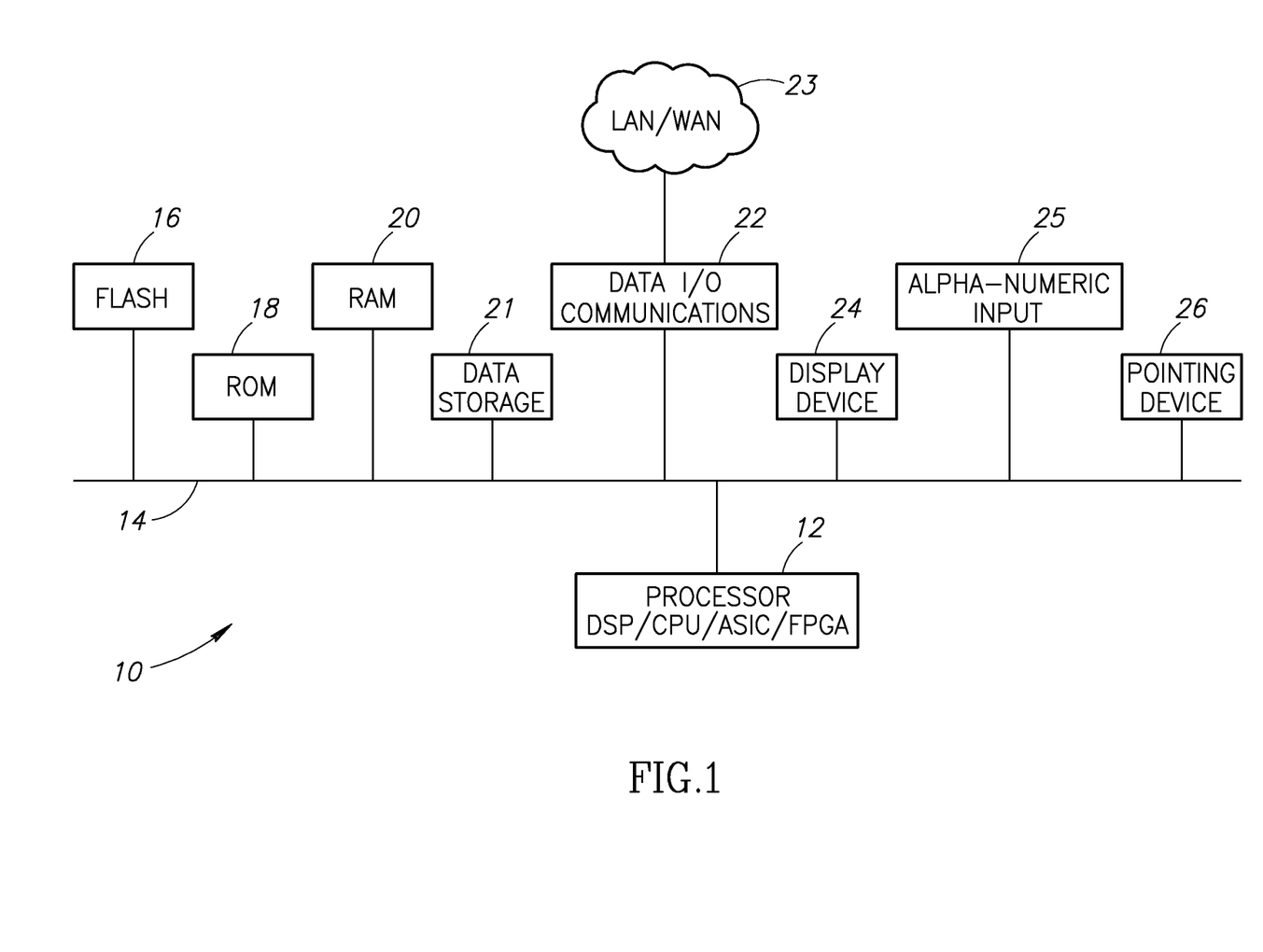
FIG. 1 is a block diagram illustrating an example computer processing system adapted to implement the web application vulnerability assessment method of the present invention.
Figure 2:
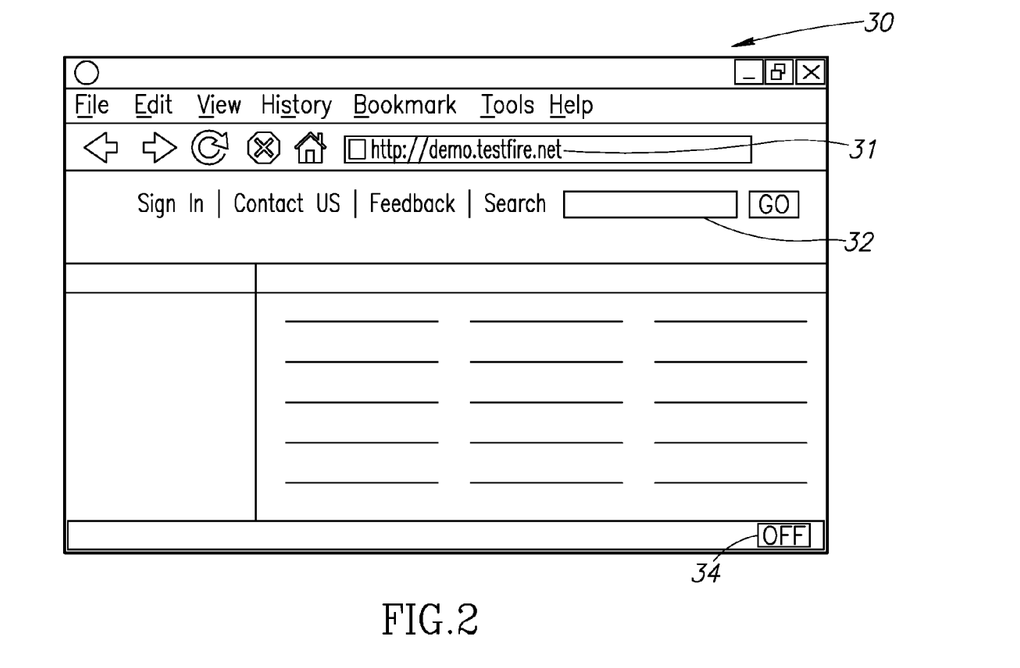
FIG. 2 is a is an example of a first in a sequence of web forms illustrating the web application vulnerability assessment method of the present invention.

A block diagram illustrating an example computer processing system adapted to implement the self web application vulnerability assessment method of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 52 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the web application vulnerability assessment method of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the web application vulnerability assessment method of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the web application vulnerability assessment method of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Browser Based Method of Assessing Web Application Vulnerability

In accordance with the invention, a user activates the browser based vulnerability assessment tool and accesses the web page of the application to be analyzed. Elements (e.g., input fields, check boxes, radio buttons, text areas, drop down lists etc.) of a web form are filled in and the form is submitted.

In one embodiment of the present invention security tests are performed as the user is filling in the form (clicking on links, etc.) and any results are immediately displayed on a status bar (typically at the bottom of the screen). When submitting the form, or performing any HTTP request, all HTTP and URL parameters are tested for security vulnerabilities. All parameters on the form (whether filled or not), any hidden parameters that might exist and any parameters on the URL itself are tested.

The method of the present invention listens in on the HTTP requests performed while a user is browsing the active web application. All such requests are inspected, and any "testable entity" that is found (for example parameters, headers, cookies, post body, XML data etc.) is queued for immediate testing. Rules are applied and security tests immediately begin for those testable entities. These tests can include (but are not limited to): cross-site scripting (XSS), SQL injection, and blind SQL injection. The tests are initiated while the next page is loading (with all its images etc.), generating results almost immediately (in most cases).

Figure 3:
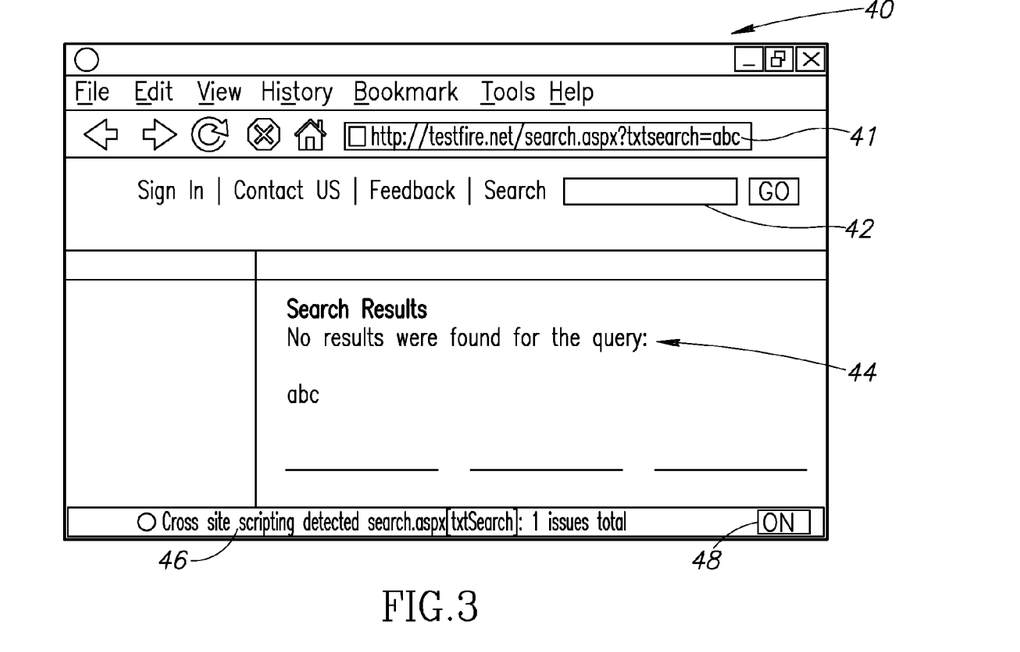
FIG. 3 is a is an example of a second in a sequence of web forms illustrating the web application vulnerability assessment method of the present invention.

An example implementation of the present invention is found in FIGS. 2, 3, 4, 5 and 6, which show a web application being accessed by a browser with a browser add-on implementing the web application vulnerability assessment method of the present invention. Referred to FIG. 2, the dialog box, generally referenced 30, comprises a web form with URL 31, search field 32 and on/off indicator (i.e. for the browser plug-in tool) 34 currently "off". In this case, a search is performed based on the value entered in search field 32 and the web application progresses to FIG. 3. FIG. 3, generally referenced 40, comprises the resulting web form, with URL 41, search field 42, search result 44 (from web form 30), detected security vulnerability 46, in this case cross-site scripting (for search field 32 on web form 30). On/off indicator 48 is in the "on" position.

Figure 4:
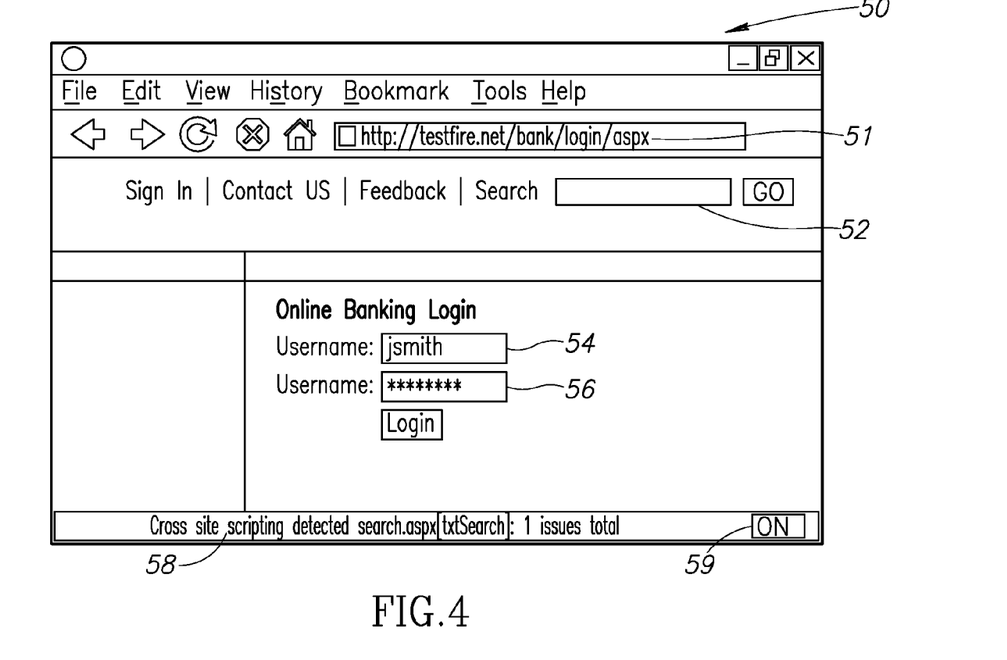
FIG. 4 is a is an example of a third in a sequence of web forms illustrating the web application vulnerability assessment method of the present invention.
Figure 5:
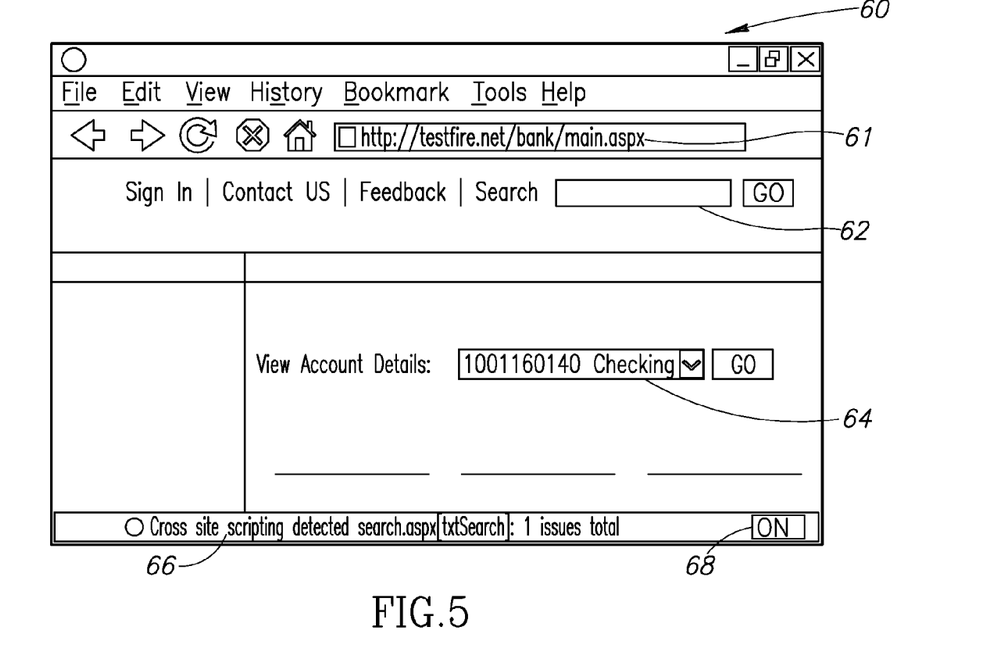
FIG. 5 is a is an example of a fourth in a sequence of web forms illustrating the web application vulnerability assessment method of the present invention.

The web application then proceeds to the dialog box on FIG. 4. The dialog box, generally referenced 50, comprises a web form with URL 51, elements search field 52, user name 54, password 56, detected security vulnerability 58 and on/off indicator 59, currently "on". The vulnerability detected is cross-site scripting for search field 42 on web form 40. Going forward in the web application, the dialog box in FIG. 5, generally referenced 60, comprises a web form with URL 61, search field 62, drop-down list 64 and detected security vulnerability 66 and on/off indicator 68. The displayed security vulnerability in this case is SQL injection for the username and password fields on web form 50. The message also notes that there are six (i.e. five other) detected security vulnerabilities on web form 50.

Figure 6:
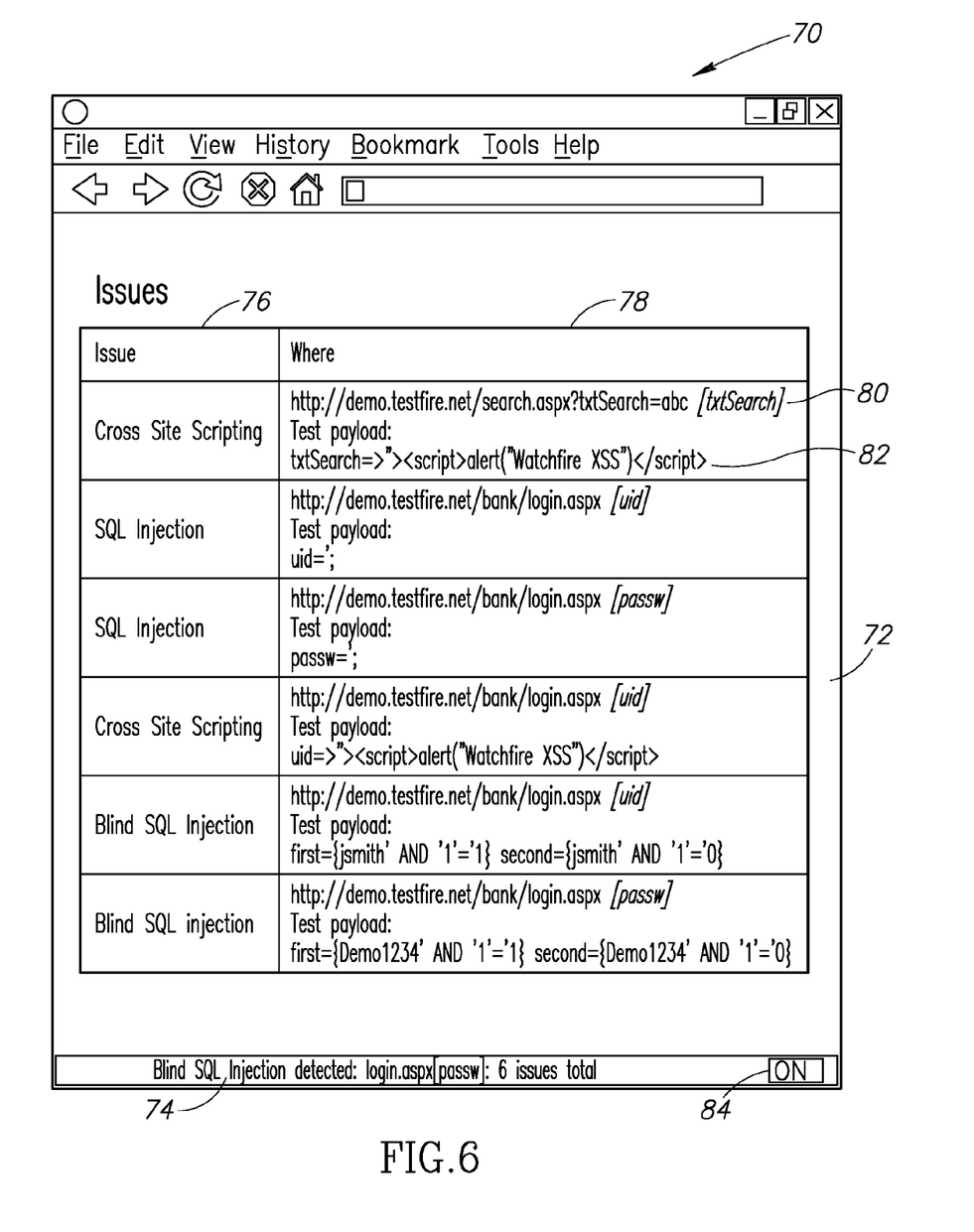
FIG. 6 is a is an example of a fifth in a sequence of web forms illustrating the web application vulnerability assessment method of the present invention.

Finally, the dialog box shown in FIG. 6, generally referenced 70 comprises issue log 72 (a log of the detected security vulnerabilities in the browsed web application) and detected security vulnerability 74. The detected security vulnerability is for the last web form which encountered a security vulnerability, in this case web form 58. Each entry is the issue log comprises issue type 76 (SQL injection etc.), "where" information 78 and on/off indicator 84. The "where" information is further comprised of the URL of the detected vulnerability 80 and test payload (i.e. entered data that reveals the vulnerability) 82.

Figure 7:
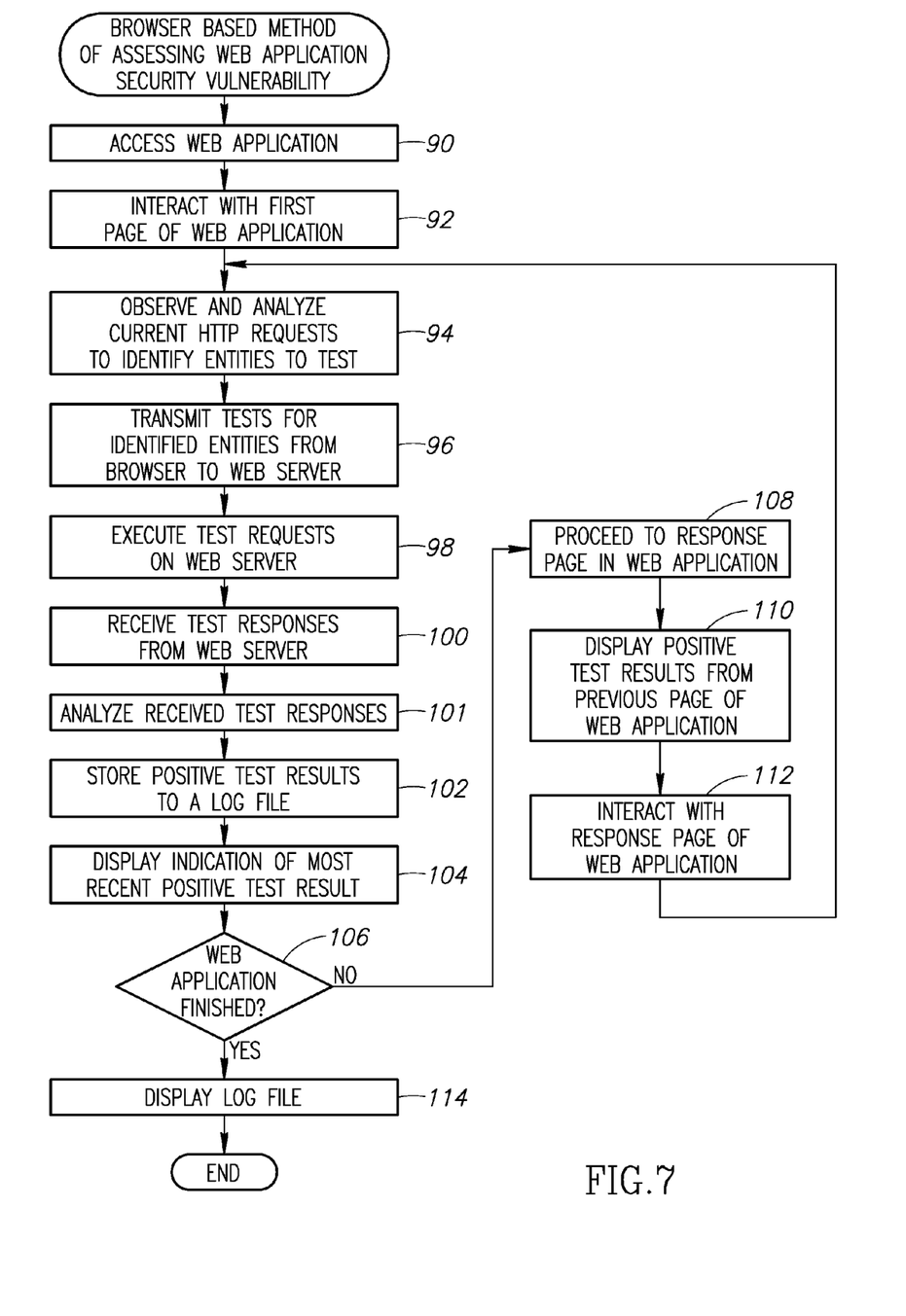
FIG. 7 is a flow diagram illustrating the application vulnerability assessment method of the present invention.

A flow diagram illustrating the browser based method of assessing web application vulnerability is shown in FIG. 7. First, the web application to be tested is accessed (step 90). Next, the first web form of the web application is interacted with (step 92) and HTTP requests from the current page are observed and analyzed in order to identify entities to test (step 94). Tests for the identified entities are transmitted from to browser to the server (step 96), the test requests are executed on the server (step 98) and the browser then receives the test responses from the server (step 100). Test responses are analyzed to determine whether they are positive or negative (step 100), and the positive test results (i.e. security vulnerabilities) are then stored to a log file (step 102). Note that in an alternative embodiment of the present invention, all test results (i.e. positive and negative) are stored to a log file. An indication of the most recent positive test result is then displayed (step 104).

If the web application is not finished (step 106), then the web application proceeds to the response page from the previously submitted web form (step 108) and the positive test results from the previously submitted web form are displayed (step 110). The response page is now active for interaction (step 112) and the method of the present invention returns to step 94. If the web application is finished then finally, the log file is displayed (step 114). In an alternative embodiment of the present invention, the log file can be displayed at any point in response to a user request.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of assessing a vulnerability of an active web form during a browsing session, said method comprising the steps of:
    browsing the active web form by a user;
    monitoring one or more HTTP requests transmitted from said browser to a server during the browsing session by a browser add-on, wherein the one or more HTTP requests result from the user interacting with the active web form;
    analyzing by the browser add-on said one or more HTTP requests to detect one or more testable entities;
    executing at the server one or more security vulnerability tests for only said one or more testable entities detected while a response page corresponding with the one or more HTTP requests of the active web form is loading during the browsing session;
    displaying the results of said one or more security vulnerability tests; and
    if the results to the one or more security vulnerability tests are positive, displaying the results of the one or more security vulnerability tests of a previous page corresponding with the active web form on the response page.

2. The method according to claim 1, wherein said one or more HTTP requests are issued by an element of said active web form.

3. The method according to claim 1, wherein one or more of said one or more testable entities is not displayed on said active web form.

4. The method according to claim 1, wherein said step of analyzing comprises the steps of:
    generating one or more tests for each of said one or more testable entities to be analyzed;
    transmitting said one or more tests to said server; and
    receiving a response to each of said one or more tests.

5. The method according to claim 4, wherein said step of generating is executed by said browser.

6. The method according to claim 4, wherein said step of transmitting is executed by said browser.

7. The method according to claim 2, wherein said step of receiving is executed by said browser.

8. The method according to claim 2, wherein said one or more tests are executed by said server.

9. A method of assessing the a vulnerability of an active web form during a browsing session, said method comprising the steps of:
    browsing the active web form by a user;
    monitoring one or more HTTP requests transmitted from said browser to a server during the browsing session by a browser add-on, wherein the one or more HTTP requests result from the user interacting with the active web form;
    analyzing by the browser add-on said one or more HTTP requests to detect one or more testable entities;
    executing at the server one or more security vulnerability tests for only said one or more testable entities detected, while a response page corresponding with the one or more HTTP requests of the active web form is loading during the browsing session;
    saving the results of said one or more security vulnerability tests to a log file; and
    if the results to the one or more security vulnerability tests are positive, displaying the results of the one or more security vulnerability tests of a previous page corresponding with the active web form on the response page.

10. The method according to claim 9, wherein said one or more HTTP requests are issued by an element of said active web form.

11. The method according to claim 9, wherein said step of analyzing comprises the steps of:
    generating one or more tests for each of said one or more testable entities to be analyzed;
    transmitting said one or more tests to said server; and
    receiving a response to each of said one or more tests.

12. The method according to claim 11, wherein said step of generating is executed by said browser.

13. The method according to claim 10, wherein said step of transmitting is executed by said browser.

14. The method according to claim 10, wherein said step of receiving is executed by said browser.

15. The method according to claim 10, wherein said one or more tests are executed by said server.

16. A computer program product for assessing a vulnerability of an active web form during a browsing session, the computer program product comprising:
- a non-transitory computer usable medium having computer usable code embodied therewith, the computer program product comprising:
- computer usable code configured for browsing the active web form by a user;
- computer usable code configured for monitoring one or more HTTP requests transmitted from said browser to a server during the browsing session by a browser add-on, wherein the one or more HTTP requests result from the user interacting with the active web form;
- computer usable code configured for analyzing by the browser add-on said one or more HTTP requests to detect one or more testable entities;
- computer usable code configured for executing at the server one or more security vulnerability tests for only said one or more testable entities detected while a response page corresponding with the one or more HTTP requests of the active web form is loading during the browsing session;
- computer usable code configured for displaying any detected the results of said one or more security vulnerability tests; and
- if the results to the one or more security vulnerability tests are positive, computer usable code configured for displaying the results of the one or more security vulnerability tests of a previous page corresponding with the active web form on the response page.

17. The computer program product according to claim 16, wherein said computer program product comprises a web browser plug-in.

18. The computer program product according to claim 16, wherein said one or more HTTP requests are issued by an element of said active web form.

19. The computer program product according to claim 16, wherein one or more of said one or more testable entities is not displayed on said active web form.

20. The computer program product according to claim 16, wherein said computer usable code configured for analyzing comprises:
- computer usable code configured for generating one or more tests for each of said one or more testable entities to be analyzed;
- computer usable code configured for transmitting said one or more tests to said server; and
- computer usable code configured for receiving a response to each of said one or more tests.

21. A computer program product for assessing the vulnerability of an active web form during a browsing session, the computer program product comprising:
- a non-transitory computer usable medium having computer usable code embodied therewith, the computer program product comprising:
- computer usable code configured for browsing the active web form by a user;
- computer usable code configured for monitoring one or more HTTP requests transmitted from said browser to a server during the browsing session by a browser add-on, wherein the one or more HTTP requests result from the user interacting with the active web form;
- computer usable code configured for analyzing by the browser add-on said one or more HTTP requests to detect one or more testable entities;
- computer usable code configured for executing by the server one or more security vulnerability tests for only said one or more testable entities detected while a response page corresponding with the one or more HTTP requests of the active web form is loading during the browsing session;
- if the results to the one or more security vulnerability tests are positive, computer usable code configured for displaying the results of the one or more security vulnerability tests of a previous page corresponding with the active web form on the response page;
- computer usable code configured for saving the results of said one or more security vulnerability tests to a log file; and
- computer usable code configured for displaying said log file.

22. The computer program product according to claim 21, wherein said computer program product comprises a web browser plug-in.

23. The computer program product according to claim 21, wherein said one or more HTTP requests are issued by an element of said active web form.

24. The computer program product according to claim 21, wherein one or more of said one or more testable entities is not displayed on said active web form.

25. The computer program product according to claim 21, wherein said computer usable code configured for analyzing comprises:
- computer usable code configured for generating one or more tests for each of said one or more testable entities to be analyzed;
- computer usable code configured for transmitting said one or more tests to said server; and
- computer usable code configured for receiving a response to each of said one or more tests.

* * * * *